(12) United States Patent
Russell et al.

(10) Patent No.: US 9,663,709 B2
(45) Date of Patent: May 30, 2017

(54) VISCOSIFIED TREATMENT FLUIDS COMPRISING POLYOL DERIVATIZED CELLULOSE AND METHODS RELATING THERETO

(71) Applicant: Halliburton Energy Services, Inc., Houston, TX (US)

(72) Inventors: Aaron Gene Russell, Humble, TX (US); Dipti Singh, Kingwood, TX (US); Jeremy Holtsclaw, Kingwood, TX (US); Jim D. Weaver, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 302 days.

(21) Appl. No.: 14/386,295

(22) PCT Filed: Nov. 25, 2013

(86) PCT No.: PCT/US2013/071711
§ 371 (c)(1),
(2) Date: Sep. 18, 2014

(87) PCT Pub. No.: WO2015/076845
PCT Pub. Date: May 28, 2015

(65) Prior Publication Data
US 2016/0257877 A1 Sep. 8, 2016

(51) Int. Cl.
*C09K 8/90* (2006.01)
*E21B 43/04* (2006.01)
(Continued)

(52) U.S. Cl.
CPC .................. *C09K 8/90* (2013.01); *C09K 8/68* (2013.01); *C09K 8/685* (2013.01); *C09K 8/88* (2013.01);
(Continued)

(58) Field of Classification Search
CPC .. C09K 8/90; C09K 8/68; E21B 43/04; E21B 43/26; E21B 43/267
See application file for complete search history.

(56) References Cited

U.S. PATENT DOCUMENTS 4,553,601 A 11/1985 Almond et al.
4,579,942 A 4/1986 Brode et al.
(Continued)

FOREIGN PATENT DOCUMENTS

WO 2015076845 A1 5/2015

OTHER PUBLICATIONS

"Click" Chemistry as a Promising Tool for Side Chain Functionalization of PolyUrethanes, Macromolecules, 2008, 41, 4622-4630.
(Continued)

*Primary Examiner* — Zakiya W Bates
*Assistant Examiner* — Crystal J Miller
(74) *Attorney, Agent, or Firm* — McDermott Will & Emery LLP

(57) ABSTRACT

Viscosified treatment fluids that include polyol derivatized cellulose may be useful in subterranean operations. For example, a method may include introducing a viscosified treatment fluid into a wellbore penetrating a subterranean formation, wherein the viscosified treatment fluid comprises an aqueous base fluid, borate ions, and a polyol derivatized cellulose, and wherein the polyol derivatized cellulose comprise a cellulosic backbone derivatized with pendants comprising (1) a terminal polyol and (2) at least one of an internal 1,2,3-triazole, an internal ester, and an internal amide.

20 Claims, 1 Drawing Sheet

(51) Int. Cl.
*C09K 8/68* (2006.01)
*C09K 8/88* (2006.01)
*E21B 43/26* (2006.01)
*E21B 43/267* (2006.01)

(52) U.S. Cl.
CPC .............. *C09K 8/887* (2013.01); *E21B 43/04* (2013.01); *E21B 43/26* (2013.01); *E21B 43/267* (2013.01); *C09K 2208/24* (2013.01); *C09K 2208/26* (2013.01)

(56) References Cited

U.S. PATENT DOCUMENTS

| | | | |
|---|---|---|---|
| 5,304,620 | A | 4/1994 | Holtmyer et al. |
| 2006/0003900 | A1* | 1/2006 | Hanes .................... C09K 8/685 507/203 |
| 2006/0196662 | A1 | 9/2006 | Hanes et al. |
| 2006/0205605 | A1 | 9/2006 | Dessinges et al. |
| 2006/0223727 | A1 | 10/2006 | Salamone et al. |
| 2008/0194431 | A1 | 8/2008 | Fu et al. |
| 2008/0289827 | A1 | 11/2008 | Welton et al. |
| 2012/0004148 | A1* | 1/2012 | Ogle ........................ C09K 8/12 507/213 |
| 2012/0129954 | A1 | 5/2012 | Falcone et al. |
| 2012/0220503 | A1 | 8/2012 | Sanchez Reyes et al. |
| 2013/0142837 | A1 | 6/2013 | Torrella et al. |
| 2013/0312970 | A1* | 11/2013 | Lafitte .................... A61K 8/022 166/305.1 |
| 2015/0075789 | A1* | 3/2015 | Singh .................... C09K 8/685 166/278 |

OTHER PUBLICATIONS

Click Chemistry with Polysaccharides, Macromol Rapid Commumm, 2006, 27, 208-213.
Studies on the Molecular Flexibility of Novel Dendronized Carboxymethyl Cellulose Derivatives, European Polymer Journal, 2009, 45, 1098.
Polycationic a-Cyclodextrin "Click Clusters": Monodisperse and Versatile Scaffolds for Nucleic Acid Delivery, J. Am Chem. Soc. 2008, 130, 4618.
Conjugation of Nucleosides and Oligonucleotides by ]3+2] Cycloaddition, J. Org. Chem. 2008, 73, 287.
Polysaccharides: The "Click" Chemistry Impact, Polymers 2011, 3, 1607-1651.
Oilfield Technology and Applications Involving Borates, p. 425-429, not dated.
Zhang et al., "Controlling Deposition and Release of Polyol-Stabilized Latex on Boronic Acid-Derivatized Cellulose," Langmuir 2010, 26(22), 17237-17241.
Weith et al., "Synthesis of Cellulose Derivatives Containing the Dihydroxyboryl Group and a Study of Their Capacity to Form Specific Complexes with Sugars and Nucleic Acid Components," Biochemistry, vol. 9, No. 22, 1970.
International Search Report and Written Opinion for PCT/US2013/071711 dated Aug. 22, 2014.

* cited by examiner

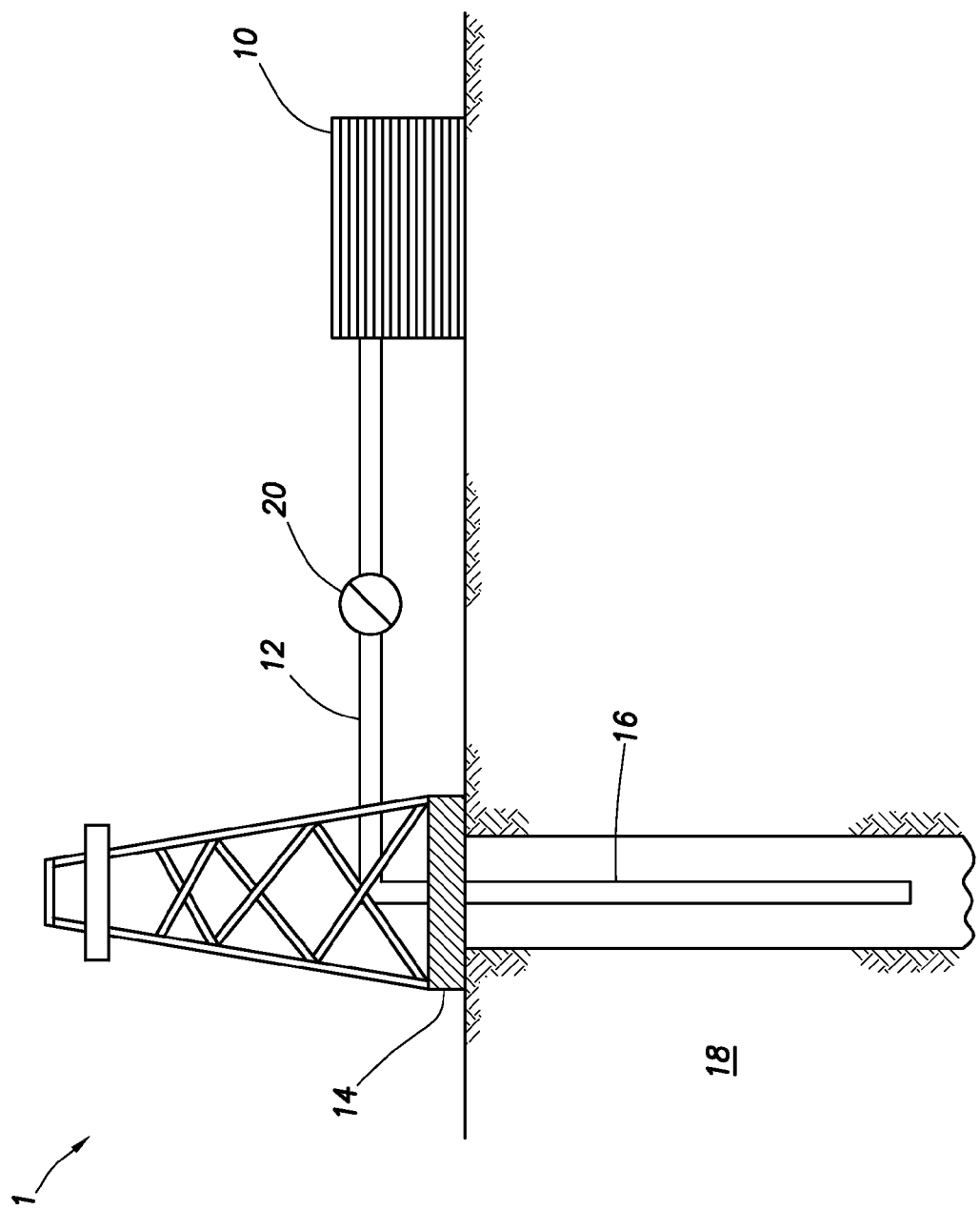

VISCOSIFIED TREATMENT FLUIDS COMPRISING POLYOL DERIVATIZED CELLULOSE AND METHODS RELATING THERETO

BACKGROUND

The embodiments described herein relate to viscosified treatment fluids comprising polyol derivatized cellulose and methods of use in subterranean operations.

Viscosified treatment fluid are often used in subterranean operations. For example in fracturing operations, viscosified treatment fluids can be used as the pad fluid that is introduced into the formation at a pressure above the fracture gradient of the formation so as to create or extend at least one fracture therein. Increasing the viscosity of the fluid allows for higher pressures and may result in greater fracture length. In another example, viscosified treatment fluids can be used to transport particles downhole (e.g., for forming gravel packs or proppant packs). The viscosity of the fluid aids in suspending the particles and allows for higher concentrations of particles in the fluid.

An example of a gel system used to viscosify a treatment fluid is guar polymer with borate ions. In this gel system, borate crosslinks between the guar polymers form rapidly and are also readily broken by shear. Together, this allows for the viscosified treatment fluid to maintain viscosity in low to no shear conditions, which mitigates particle settling. Also, in shear conditions the rapid forming and breaking of crosslinks allows for the fluid to be more pumpable (e.g., requires less energy to pump) while maintaining a viscosity that, in combination with the shear, mitigates particle settling.

While the guar/borate gel systems have advantages, the guar polymer introduces disadvantages to the system. For example, because some guar polymers (e.g., carboxymethyl hydroxypropyl guar and carboxymethyl guar) are ionic at pH 8-12 where crosslinking occurs, the gel systems are sensitive to salt concentration, thereby limiting functionality in brines and in formations with salty native fluids. In another example, guar polymers tend to leave a residue in the formation that can clog some of the formation pore space and reduce permeability. Reduced permeability can reduce the efficacy of hydrocarbon production from the formation.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 shows an illustrative schematic of a system that can deliver viscosified treatment fluids described herein to a downhole location, according to one or more embodiments.

DETAILED DESCRIPTION

The embodiments described herein relate to viscosified treatment fluids comprising polyol derivatized cellulose and methods of use in subterranean operations.

Cellulose and its common derivatives are not crosslinkable by borate because they lack diol functionality, which guar has. The polyol derivatized celluloses described herein advantageously are crosslinkable by borate, which provides the advantages of rapid crosslink formation and breaking under shear described above.

Additionally, using cellulose and derivatives thereof as the polymer backbone is advantageous because cellulose and derivatives thereof typically leave less residue in the formation as compared to guar derivatives. Therefore, the polyol derivatized celluloses described herein may impact formation permeability and hydrocarbon production to a lesser degree as compared to guar.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges, some lower limits listed may be greater than some upper limits listed. One skilled in the art will recognize that the selected subset will require the selection of an upper limit in excess of the selected lower limit.

The polyol derivatized celluloses described herein may comprise a cellulosic backbone derivatized with pendants comprising (1) a terminal polyol (e.g., a diol, a 1,4-diol, a 1,3-diol, a 1,2-diol, a triol, a tetraol, a pentol, and any derivative thereof) and (2) at least one of an internal 1,2,3-triazole, an internal ester, and an internal amide. In some instances, more than one of the foregoing pendants may be derivatized on a cellulosic backbone. As used herein, "internal" refers to a chemical unit that is between the cellulosic backbone and the terminal polyol.

Examples of cellulosic backbones may include, but are not limited to, cellulose, carboxymethylcellulose, methyl cellulose, a polysaccharide, and the like, any derivative thereof, and any copolymer thereof.

Examples of pendants on a cellulosic backbone are provided in Compounds 1-4 below. Compound 1 illustrates a cellulose backbone with an internal amide and a terminal polyol. Compound 2 illustrates a methyl cellulose backbone with an internal amide and a terminal 1,2-diol. Compound 3 illustrates a carboxymethylcellulose backbone with an internal 1,2,3-triazole and a terminal diol. Compound 4 illustrates a methyl cellulose backbone with an internal 1,2,3-triazole and a terminal 1,2-diol.

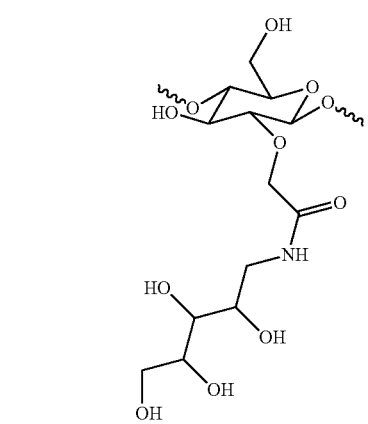

Compound 1

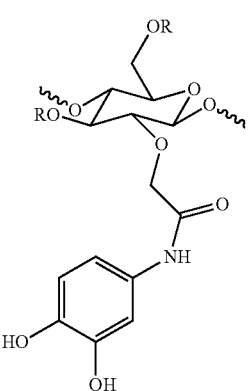

Compound 2

R = CH₃ or R = H

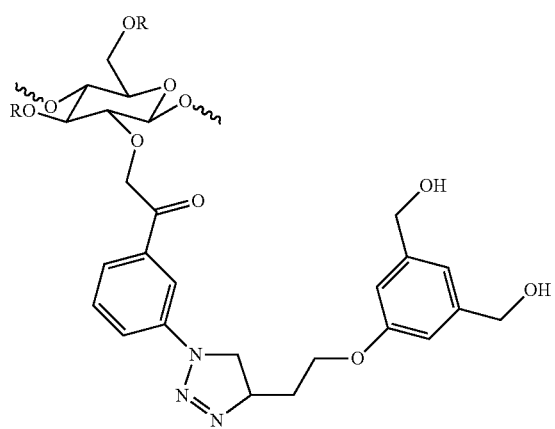

Compound 3

R = CH₂CO₂H or R = H

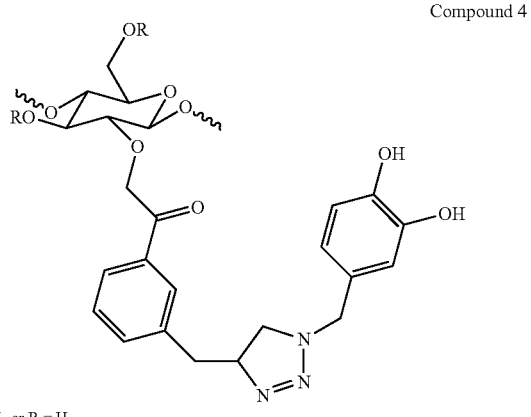

Compound 4

R = CH₃ or R = H

Internal amides and esters of pendants may be achieved by, for example, performing an EDC (N-(3-dimethylaminopropyl)-N'-ethylcarbodiimide hydrochloride) coupling reaction between the carboxylic acid on the cellulosic backbone and an amine or alcohol having polyol functionality. Alternatively, EDC coupling may be between a hydroxyl on the cellulosic backbone and a carboxylate having a polyol functionality. Examples of amines, alcohols, and carboxylates having polyol functionality may include, but are not limited to, those of Compounds 5-10.

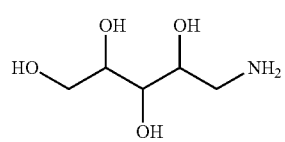

Compound 5

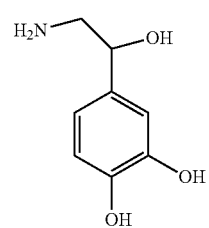

Compound 6

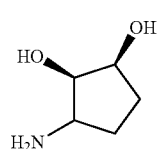

Compound 7

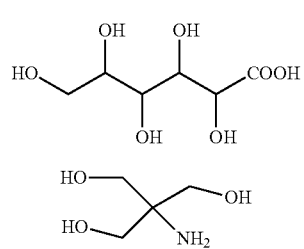

Compound 8

Compound 9

Compound 10

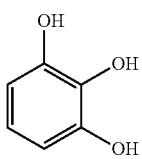

Internal 1,2,3-triazols may be achieved by, for example, click chemistry by reacting an azide with a alkyne. First, the cellulose may first be derivatized with either the azide or the alkyne, followed by subsequent click chemistry to yield the internal 1,2,3-triazol. The derivatization of the cellulose may be achieved with an epoxy or alkyl chloride of the desired azide or alkyne that is reacted with a hydroxyl or salt thereof. Then, the corresponding azide or alkyne with a terminal polyol may be reacted therewith. Examples of alkynes suitable for use in such reactions may include, but are not limited to, those of Compounds 11-18. Examples of azides suitable for use in such reactions may include, but are not limited to, those of Compounds 19-22.

Compound 11

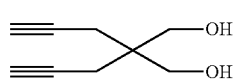

Compound 12

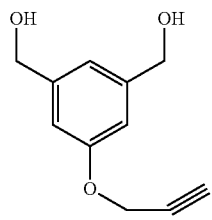

Compound 13

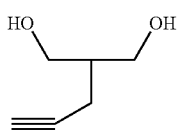

Compound 14

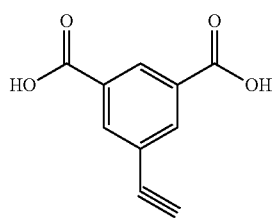

Compound 15

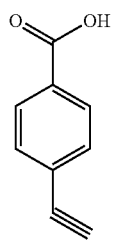

Compound 16

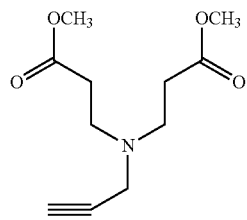

Compound 17

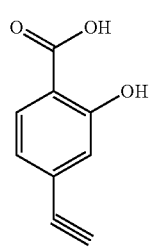

Compound 18

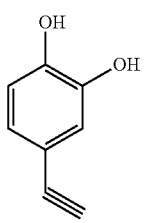

Compound 19

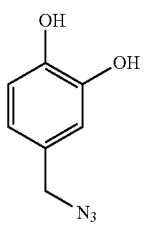

Compound 20

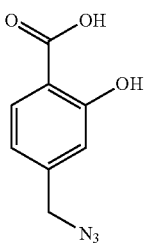

Compound 21

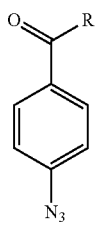

R = OCH$_3$ or R = OH

-continued

Compound 22

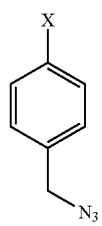

X = F/Cl/Br

In some embodiments, a viscosified treatment fluid may comprise an aqueous base fluid, polyol derivatized celluloses described herein, and borate ions. In some instances, combinations of the foregoing polyol derivatized celluloses may be included in a viscosified treatment fluid. In some embodiments, the polyol derivatized celluloses may be present in the viscosified treatment fluid in an amount ranging from a lower limit of about 0.1% or 0.5% by weight of the viscosified treatment fluid to an upper limit of about 1% or 0.5% by weight of the viscosified treatment fluid, and wherein the amount of the polyol derivatized celluloses may range from any lower limit to any upper limit and encompasses any subset therebetween.

In some embodiments, the borate ions may be provided by including in the viscosified treatment fluid any compound that is capable of producing one or more borate ions (e.g., boric acid, disodium octaborate tetrahydrate, sodium diborate, pentaborates, and the like, and any combination thereof). In some embodiments, the borate ions may be provided by including in the viscosified treatment fluid a polymer comprising a boronic acid functional group.

In some embodiments, the source of borate ions (e.g., boric acid, disodium octaborate tetrahydrate, sodium diborate, pentaborates, and polymers comprising a boronic acid functional group) may be present in the viscosified treatment fluid in an amount ranging from a lower limit of about 0.001%, 0.005%, 0.01%, or 0.05% by weight of the viscosified treatment fluid to an upper limit of about 1%, 0.5%, or 0.1% by weight of the viscosified treatment fluid, and wherein the amount may range from any lower limit to any upper limit and encompasses any subset therebetween.

Aqueous base fluids suitable for use in the viscosified treatment fluids described herein may comprise fresh water, saltwater (e.g., water containing one or more salts dissolved therein), brine (e.g., saturated salt water), seawater, or combinations thereof. Generally, the water may be from any source, provided that it does not contain components that might adversely affect the stability and/or performance of the viscosified treatment fluid. In certain embodiments, the density of the aqueous base fluid can be adjusted, among other purposes, to provide additional particulate transport and suspension in the viscosified treatment fluids used in the methods described herein. In certain embodiments, the pH of the aqueous base fluid may be adjusted (e.g., by a buffer or other pH adjusting agent), among other purposes, to activate a crosslinking agent and/or to reduce the viscosity of a viscosified treatment fluid (e.g., activate a breaker, deactivate a crosslinking agent). In these embodiments, the pH may be adjusted to a specific level, which may depend on, among other factors, the types of gelling agents, acids, and other additives included in the viscosified treatment fluid. One of ordinary skill in the art, with the benefit of this disclosure, will recognize when such density and/or pH adjustments are appropriate. In some embodiments, the pH range may preferably be from about 8 to about 12.

Some embodiments may involve introducing a viscosified treatment fluid described herein that include polyol derivatized celluloses into a wellbore penetrating a subterranean formation. In some instances, a viscosified treatment fluid described herein may be used in fracturing or gravel packing operations.

In some fracturing operations, a pad fluid is introduced into a wellbore penetrating the subterranean formation at a pressure sufficient to create or extend at least one fracture in the subterranean formation and is followed by a proppant slurry so as to form a proppant pack in the at least one fracture with proppant particles in the proppant slurry. The viscosified treatment fluids described herein that include polyol derivatized celluloses may be used as the pad fluid, the proppant slurry or both.

In some gravel packing operations, a gravel packing fluid that includes gravel particles is introduced into a wellbore penetrating the subterranean formation; and a gravel pack is formed in an annulus in the wellbore (e.g., an annulus between the wellbore and a screen disposed therein) and may extend into the subterranean formation.

It should be understood that the term "particulate," as used in this disclosure, includes all known shapes of materials, including substantially spherical materials, fibrous materials, polygonal materials (such as cubic materials), and combinations thereof. Moreover, fibrous materials, that may or may not be used to bear the pressure of a closed fracture, may be used as proppant particles. Examples of proppant particles or gravel particles suitable for use in conjunction with the methods described herein may include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size generally may range from about 2 mesh to about 400 mesh or less on the U.S. Sieve Series; however, in certain circumstances, other sizes or mixtures of sizes may be desired and will be entirely suitable for practice of the embodiments described herein. In particular embodiments, preferred mean particulates size distribution ranges are one or more of 6/12, 8/16, 12/20, 16/30, 20/40, 30/50, 40/60, 40/70, or 50/70 mesh.

In some embodiments, the proppant particles or gravel particles may be present in the viscosified treatment fluid in an amount ranging from a lower limit of about 0.5 pound per gallon ("ppg"), 1 ppg, or 5 ppg of the viscosified treatment fluid to an upper limit of about 30 ppg, 20 ppg, or 10 ppg of the viscosified treatment fluid, and wherein the amount of the proppant particles or gravel particles may range from any lower limit to any upper limit and encompasses any subset therebetween.

In some embodiments, a viscosified treatment fluid described herein may also include internal delayed gel breakers such as enzyme, oxidizing, acid buffer, or temperature-activated gel breakers. The gel breakers may cause the viscosified treatment fluids to revert to thin fluids that can be produced back to the surface after they have been used to place proppant particles in subterranean fractures. In certain embodiments, the gel breaker used may be present in the viscosified treatment fluid in an amount in the range of from a lower limit of about 0.0001%, 0.001%, 0.01%, or 0.1% by weight of the gelling agent to an upper limit of about 10%, 5%, 1%, or 0.5% by weight of the gelling agent, and wherein the amount of the gel breaker may range from any lower limit to any upper limit and encompasses any subset therebetween. As described above, the polyol derivatized celluloses described herein advantageously leave less residue after being broken as compared to guar systems. Less residue provides for higher permeability and greater hydrocarbon production from the subterranean formation.

In some embodiments, the viscosified treatment fluids described herein may further comprise an additive. Examples of additives may include, but are not limited to, salts, weighting agents, fluid loss control agents, emulsifiers, dispersion aids, corrosion inhibitors, emulsion thinners, emulsion thickeners, surfactants, lost circulation materials, foaming agents, gases, pH control additives, biocides, stabilizers, chelating agents, scale inhibitors, gas hydrate inhibitors, mutual solvents, oxidizers, reducers, friction reducers, clay stabilizing agents, and the like, and any combination thereof.

In various embodiments, systems configured for delivering the viscosified treatment fluids described herein to a downhole location are described. In various embodiments, the systems can comprise a pump fluidly coupled to a tubular, the tubular containing a viscosified treatment fluid comprising an aqueous base fluid, polyol derivatized celluloses described herein, and borate ions (and optionally further comprising at least one of breakers, proppant particles, gravel particles, and additives described herein).

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the viscosified treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the viscosified treatment fluid to the high pressure pump. In such embodiments, the low pressure pump may "step up" the pressure of the viscosified treatment fluid before it reaches the high pressure pump.

In some embodiments, the systems described herein can further comprise a mixing tank that is upstream of the pump and in which the viscosified treatment fluid is formulated. In various embodiments, the pump (e.g., a low pressure pump, a high pressure pump, or a combination thereof) may convey the viscosified treatment fluid from the mixing tank or other source of the viscosified treatment fluid to the tubular. In other embodiments, however, the viscosified treatment fluid can be formulated offsite and transported to a worksite, in which case the viscosified treatment fluid may be introduced to the tubular via the pump directly from its shipping container (e.g., a truck, a railcar, a barge, or the like) or from a transport pipeline. In either case, the viscosified treatment fluid may be drawn into the pump, elevated to an appropriate pressure, and then introduced into the tubular for delivery downhole.

FIG. 1 shows an illustrative schematic of a system that can deliver viscosified treatment fluids of the present invention to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a viscosified treatment fluid of the present invention may be formulated. The viscosified treatment fluid may be conveyed via line 12 to wellhead 14, where the viscosified treatment fluid enters tubular 16, tubular 16 extending from wellhead 14 into subterranean formation 18. Upon being ejected from tubular 16, the viscosified treatment fluid may subsequently penetrate into subterranean formation 18. Pump 20 may be configured to raise the pressure of the viscosified treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the viscosified treatment fluid may, in some embodiments, flow back to wellhead 14 and exit subterranean formation 18. In some embodiments, the viscosified treatment fluid that has flowed back to wellhead 14 may subsequently be recovered and recirculated to subterranean formation 18.

It is also to be recognized that the disclosed viscosified treatment fluids may also directly or indirectly affect the various downhole equipment and tools that may come into contact with the viscosified treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

One or more illustrative embodiments incorporating the invention embodiments disclosed herein are presented herein. Not all features of a physical implementation are described or shown in this application for the sake of clarity.

It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

Embodiments disclosed herein include:

A. a method that includes introducing a viscosified treatment fluid into a wellbore penetrating a subterranean formation, wherein the viscosified treatment fluid comprises an aqueous base fluid, borate ions, and a polyol derivatized cellulose, and wherein the polyol derivatized cellulose comprise a cellulosic backbone derivatized with pendants comprising (1) a terminal polyol and (2) at least one of an internal 1,2,3-triazole, an internal ester, and an internal amide; and B. a method that includes introducing a viscosified treatment fluid into a wellbore penetrating a subterranean formation, wherein the viscosified treatment fluid comprises an aqueous base fluid, borate ions, a breaker, and a polyol derivatized cellulose, and wherein the polyol derivatized cellulose comprise a cellulosic backbone derivatized with pendants comprising (1) a terminal polyol selected from the group consisting of a diol, a 1,4-diol, a 1,3-diol, a 1,2-diol, a triol, a tetraol, a pentol, and any derivative thereof and (2) at least one of an internal 1,2,3-triazole, an internal ester, and an internal amide.

Each of embodiments A and B may have one or more of the following additional elements in any combination: Element 1: wherein the terminal polyol is at least one selected from the group consisting of a diol, a 1,4-diol, a 1,3-diol, a 1,2-diol, a triol, a tetraol, a pentol, and any derivative thereof; Element 2: wherein the cellulosic backbone comprises at least one selected from the group consisting of cellulose, carboxymethylcellulose, methyl cellulose, a polysaccharide, and any combination thereof; Element 3: wherein introducing the viscosified treatment fluid into the wellbore is at a pressure sufficient to create or extend at least one fracture in the subterranean formation; Element 4: wherein the viscosified treatment fluid further comprises a plurality of proppant particles, and wherein the method further comprises forming a proppant pack in at least one fracture extending from the wellbore into the subterranean formation; Element 5: wherein the viscosified treatment fluid further comprises a plurality of gravel particles, and wherein the method further comprises forming a gravel pack in an annulus within the wellbore; Element 6: wherein the viscosified treatment fluid further comprises a breaker; Element 7: wherein the polyol derivatized cellulose is present in an amount of about 0.1% to about 1% by weight of the viscosified treatment fluid; Element 8: wherein the borate ions are provided by including in the viscosified treatment fluid as at least one of boric acid, disodium octaborate tetrahydrate, sodium diborate, a pentaborate, a polymer comprising a boronic acid functional group, and any combination thereof; Element 9: wherein the borate ions are present in an amount of about 0.001% to about 1% by weight of the viscosified treatment fluid; Element 10: wherein the method further includes forming the internal amide or the internal ester by performing an EDC coupling reaction between a carboxylic acid on the cellulosic backbone and an amine or alcohol having polyol functionality (e.g., Compounds 5-10); Element 11: wherein the method further includes forming the internal amide or the internal ester by performing an EDC coupling between a hydroxyl on the cellulosic backbone and a carboxylate having a polyol functionality (e.g., Compound 8); Element 12: wherein the cellulosic backbone is functionalized with a first azide or a first alkyne, and wherein the method further includes forming the internal 1,2,3-triazol by performing a click chemistry reaction between one of the first azide and a second alkyne having a polyol functionality or the first alkyne and a second azide having a polyol functionality; Element 13: Element 12 wherein the second alkyne comprises at least one of Compounds 11-18; and Element 14: Element 12 wherein the second azide comprises at least one of Compounds 19-22.

By way of non-limiting example, exemplary combinations applicable to A and B include: Element 1 in combination with Element 2; Element 8 in combination with Element 9; Element 1 in combination with Element 7; Element 1 in combination with Element 8 and optionally in combination with Element 9; Element 2 in combination with Element 7; Element 2 in combination with Element 8 and optionally in combination with Element 9; Element 8 in combination with Element 9; Element 6 in combination with any of the foregoing; at least one of Elements 10-14 in combination with any of the foregoing; and one of Elements 3-5 in combination with any of the foregoing.

Some embodiments disclosed herein may include a system that includes a pump fluidly coupled to a tubular, the tubular containing a viscosified treatment fluid comprising an aqueous base fluid, borate ions, and a polyol derivatized cellulose, and wherein the polyol derivatized cellulose comprise a cellulosic backbone derivatized with pendants comprising (1) a terminal polyol and (2) at least one of an internal 1,2,3-triazole, an internal ester, and an internal amide, and wherein the tubular penetrates a subterranean formation. In some embodiments, the system may be such that the tubular extends from a wellhead and is fluidly coupled to a mixing tank upstream of the wellhead with a line. In some embodiments, the viscosified treatment fluid of the system may optionally further include at least one of Elements 1-2 and 6-14 including, but not limited to, the combinations discussed above in reference to Embodiments A and B.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
introducing a viscosified treatment fluid into a wellbore penetrating a subterranean formation, wherein the viscosified treatment fluid comprises an aqueous base fluid, borate ions, and a polyol derivatized cellulose, and wherein the polyol derivatized cellulose comprise a cellulosic backbone derivatized with pendants comprising (1) a terminal polyol and (2) at least one of an internal 1,2,3-triazole, an internal ester, and an internal amide.

2. The method of claim 1, wherein the terminal polyol is at least one selected from the group consisting of a diol, a 1,4-diol, a 1,3-diol, a 1,2-diol, a triol, a tetraol, a pentol, and any derivative thereof.

3. The method of claim 1, wherein the cellulosic backbone comprises at least one selected from the group consisting of cellulose, carboxymethylcellulose, methyl cellulose, a polysaccharide, and any combination thereof.

4. The method of claim 1, wherein introducing the viscosified treatment fluid into the wellbore is at a pressure sufficient to create or extend at least one fracture in the subterranean formation.

5. The method of claim 1, wherein the viscosified treatment fluid further comprises a plurality of proppant particles, and wherein the method further comprises forming a proppant pack in at least one fracture extending from the wellbore into the subterranean formation.

6. The method of claim 1, wherein the viscosified treatment fluid further comprises a plurality of gravel particles, and wherein the method further comprises forming a gravel pack in an annulus within the wellbore.

7. The method of claim 1, wherein the viscosified treatment fluid further comprises a breaker.

8. The method of claim 1, wherein the polyol derivatized cellulose is present in an amount of about 0.1% to about 1% by weight of the viscosified treatment fluid.

9. The method of claim 1, wherein the borate ions are provided by including in the viscosified treatment fluid as at least one of boric acid, disodium octaborate tetrahydrate, sodium diborate, a pentaborate, a polymer comprising a boronic acid functional group, and any combination thereof.

10. The method of claim 1, wherein the borate ions are present in an amount of about 0.001% to about 1% by weight of the viscosified treatment fluid.

11. A method comprising:
introducing a viscosified treatment fluid into a wellbore penetrating a subterranean formation, wherein the viscosified treatment fluid comprises an aqueous base fluid, borate ions, a breaker, and a polyol derivatized cellulose, and wherein the polyol derivatized cellulose comprise a cellulosic backbone derivatized with pendants comprising (1) a terminal polyol selected from the group consisting of a diol, a 1,4-diol, a 1,3-diol, a 1,2-diol, a triol, a tetraol, a pentol, and any derivative thereof and (2) at least one of an internal 1,2,3-triazole, an internal ester, and an internal amide.

12. The method of claim 11, wherein the cellulosic backbone comprises at least one selected from the group consisting of cellulose, carboxymethylcellulose, methyl cellulose, a polysaccharide, and any combination thereof.

13. The method of claim 11, wherein introducing the viscosified treatment fluid into the wellbore is at a pressure sufficient to create or extend at least one fracture in the subterranean formation.

14. The method of claim 11, wherein the viscosified treatment fluid further comprises a plurality of proppant particles, and wherein the method further comprises forming a proppant pack in at least one fracture extending from the wellbore into the subterranean formation.

15. The method of claim 11, wherein the viscosified treatment fluid further comprises a plurality of gravel particles, and wherein the method further comprises forming a gravel pack in an annulus within the wellbore.

16. The method of claim 11, wherein the polyol derivatized cellulose is present in an amount of about 0.1% to about 1% by weight of the viscosified treatment fluid.

17. The method of claim 11, wherein the borate ions are provided by including in the viscosified treatment fluid as at least one of boric acid, disodium octaborate tetrahydrate, sodium diborate, a pentaborate, a polymer comprising a boronic acid functional group, and any combination thereof.

18. The method of claim 11, wherein the borate ions are present in an amount of about 0.001% to about 1% by weight of the viscosified treatment fluid.

19. A system comprising:
a pump fluidly coupled to a tubular, the tubular containing a viscosified treatment fluid comprising an aqueous base fluid, borate ions, and a polyol derivatized cellulose, and wherein the polyol derivatized cellulose comprise a cellulosic backbone derivatized with pendants comprising (1) a terminal polyol and (2) at least one of an internal 1,2,3-triazole, an internal ester, and an internal amide, and wherein the tubular penetrates a subterranean formation.

20. The system of claim 19, wherein the tubular extends from a wellhead and is fluidly coupled to a mixing tank upstream of the wellhead with a line.

* * * * *